United States Patent
Veluswamy et al.

(10) Patent No.: US 11,733,909 B2
(45) Date of Patent: Aug. 22, 2023

(54) SECURE-ERASE PREDICTION FOR DATA STORAGE DEVICES

(71) Applicant: Western Digital Technologies, Inc., San Jose, CA (US)

(72) Inventors: Senthil Kumar Veluswamy, Bangalore (IN); Rahul Gandhi Dhatchinamoorthy, Bangalore (IN); Kumar Ranjan, Bangalore (IN); Lingaraj Bal, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/353,043

(22) Filed: Jun. 21, 2021

(65) Prior Publication Data
US 2022/0413737 A1 Dec. 29, 2022

(51) Int. Cl.
*G06F 3/06* (2006.01)
*G06F 11/07* (2006.01)

(52) U.S. Cl.
CPC ............ *G06F 3/0652* (2013.01); *G06F 3/064* (2013.01); *G06F 3/0619* (2013.01); *G06F 3/0623* (2013.01); *G06F 3/0659* (2013.01); *G06F 3/0679* (2013.01); *G06F 11/076* (2013.01); *G06F 11/0772* (2013.01)

(58) Field of Classification Search
CPC .... G06F 3/0652; G06F 3/0619; G06F 3/0623; G06F 3/064; G06F 3/0659; G06F 3/0679; G06F 11/076; G06F 11/0772
See application file for complete search history.

(56) References Cited

U.S. PATENT DOCUMENTS

| | | |
|---|---|---|
| 6,279,153 B1 | 8/2001 | Bi et al. |
| 8,214,821 B1 | 7/2012 | Bartel et al. |
| 8,375,385 B1 | 2/2013 | Harel et al. |
| 9,111,621 B2 | 8/2015 | Krutzik et al. |
| 9,633,738 B1* | 4/2017 | Guo .................... G11C 16/30 |
| 9,892,793 B1 | 2/2018 | Bandic et al. |
| 10,289,551 B2 | 5/2019 | Cheng et al. |
| 10,379,769 B2 | 8/2019 | Dash et al. |
| 2007/0239950 A1 | 10/2007 | Kern et al. |
| 2008/0016300 A1 | 1/2008 | Yim et al. |
| 2009/0172251 A1* | 7/2009 | Norman ................ G11C 8/20 703/23 |
| 2011/0058573 A1 | 3/2011 | Balakavi et al. |
| 2015/0127919 A1* | 5/2015 | Baldwin ............ G06F 12/0813 711/166 |
| 2016/0034206 A1* | 2/2016 | Ryan .................... G06F 3/0605 711/103 |
| 2016/0124740 A1 | 5/2016 | Choi et al. |
| 2016/0210132 A1 | 7/2016 | Gerhart et al. |

(Continued)

*Primary Examiner* — Eric Cardwell
(74) *Attorney, Agent, or Firm* — Patent Law Works, LLP

(57) ABSTRACT

Systems and methods for predicting whether a nonvolatile memory block is likely capable of being securely erased to be eligible for composing into another composable infrastructure are described. A management module receives a secure-erase command to erase at least one nonvolatile memory block, determines health parameters of the nonvolatile memory block, calculates a failure index based on the health parameters, and, based on the failure index, either securely erases the block of memory or retires the nonvolatile memory block.

20 Claims, 5 Drawing Sheets

(56) References Cited

U.S. PATENT DOCUMENTS

| | | | |
|---|---|---|---|
| 2017/0131948 A1* | 5/2017 | Hoang | G06F 3/0679 |
| 2018/0173421 A1 | 6/2018 | Sela et al. | |
| 2019/0121685 A1* | 4/2019 | Coutinho | G06F 11/3452 |
| 2019/0220429 A1 | 7/2019 | Ranjan et al. | |
| 2020/0301606 A1 | 9/2020 | Muthiah | |
| 2021/0064267 A1* | 3/2021 | Hubbard | G06F 3/0652 |
| 2021/0318808 A1* | 10/2021 | Walker | G06F 3/0649 |
| 2021/0357204 A1 | 11/2021 | Nachimuthu et al. | |

\* cited by examiner

SECURE-ERASE PREDICTION FOR DATA STORAGE DEVICES

TECHNICAL FIELD

The present disclosure generally relates to distributed data storage systems and, more particularly, to secure-erase of storage nodes.

BACKGROUND

With the advent of cloud computing, architectures of data centers evolving to support temporary hosting of applications and operation of software using hardware components that may be reconfigurable into differently configured temporary infrastructures. While some elements of the infrastructure, such as processors, may be easily decomposed and recomposed into a subsequent infrastructure configuration because of the lack of need to sanitize or remove data, other elements of the infrastructure, such as memory storage devices, may retain sensitive data that could easily be compromised if detected and retrieved by a subsequent infrastructure composition.

SUMMARY

Various aspects for predicting whether a nonvolatile memory block is likely capable of being securely erased, and therefore eligible for composing into another composable infrastructure without compromising data previously stored in the nonvolatile memory block, are described.

One general aspect includes a system including a plurality of nonvolatile memory blocks, and a management module. The management module is configured to: receive a command to securely erase at least one nonvolatile memory block of the plurality of nonvolatile memory blocks in the data storage device; determine health parameters of the at least one nonvolatile memory block, where the health parameters are indicative of usage information of the at least one nonvolatile memory block; calculate a failure index based on the health parameters to predict whether the at least one nonvolatile memory block in the data storage device is likely to be securely erased; and in response to the failure index being less than a threshold, execute the command to securely erase the at least one nonvolatile memory block.

Implementations may include one or more the following features. The management module may be configured to determine a weightage rating for each of the health parameters and calculate range values of the health parameters based on a percentage measure of the health parameters. The failure index may be based on the weightage rating and the range values of the health parameters. The health parameters may include a retired block count based on a proportion of retired blocks in the data storage device to a quantity of available blocks in the data storage device. The health parameters may include a power-on ratio based on a proportion of a quantity of hours the at least one nonvolatile memory block has been powered-on to a warrantied quantity of powered hours for the at least one nonvolatile memory block. The health parameters may include a write amplification metric based on a proportion of times the at least one nonvolatile memory block was written to and read from. The health parameters may include a program fail ratio based on a proportion of a quantity of nonvolatile memory blocks in the data storage device added to a defect list in response to a programming failure of a nonvolatile memory block compared to a quantity of available nonvolatile memory blocks in the data storage device. The data storage device may be configured to add the quantity of nonvolatile memory blocks to the defect list responsive to programming failures of the quantity of nonvolatile memory devices. The health parameters may include an erase fail count based on a quantity of nonvolatile memory blocks in the data storage device added to a defect list in response to an erase failure of a nonvolatile memory block compared to a quantity of available nonvolatile memory blocks in the data storage device. The data storage device may be configured to add the quantity of nonvolatile memory blocks to the defect list responsive to erase failures of the quantity of nonvolatile memory blocks. The health parameters may include a drive life metric of the data storage device based on a proportion of a current longevity of the data storage device to a warrantied life of the data storage device that includes the at least one nonvolatile memory block. The system may further include a main controller configured to: manage a plurality of data storage devices in a composable infrastructure; determine the failure index for each data storage device of the plurality of data storage devices; compare the failure index for each data storage device of the plurality of data storage devices to the threshold; and selectively bypass, responsive to the failure index of at least one data storage device of the plurality of data storage devices being greater than the threshold, the at least one storage device during a decomposition event. The system may be further configured to, in response to the failure index being greater than the threshold: complete the command to securely erase the at least one nonvolatile memory block, and retire the at least one nonvolatile memory block.

Another general aspect includes a computer-implemented method that includes: receiving a command to securely erase at least one nonvolatile memory block of a plurality of memory blocks in a data storage device; determining health parameters of the at least one nonvolatile memory block, where the health parameters are indicative of usage information of the at least one nonvolatile memory block; calculating a failure index based on the health parameters to predict whether the at least one nonvolatile memory block is likely to be securely erased; and in response to the failure index being less than a threshold, executing the command to securely erase the at least one nonvolatile memory block.

Implementations may include one or more of the following features. The method wherein calculating the failure index further comprises: determining a weightage rating for each of the health parameters; and calculating range values of the health parameters based on a percentage measure of the health parameters. The failure index may be based on the weightage rating and the range values of the health parameters. The method wherein determining the health parameters comprises: determining a retired block count based on a proportion of retired blocks to a quantity of available nonvolatile memory blocks in the data storage device. The method wherein determining the health parameters comprises: determining a power-on ratio based on a proportion of a quantity of hours the nonvolatile memory block has been powered-on and a warrantied quantity of powered hours for the nonvolatile memory block in the data storage device. The method wherein determining the health parameters comprises: determining a write amplification metric based on a proportion of times the nonvolatile memory block in the data storage device was written to and read from. The method wherein determining the health parameters comprises: determining a program fail ratio based on a proportion of a quantity of nonvolatile memory blocks in the data storage device added to a defect list in response to a programming failure of a nonvolatile memory block in the data storage device compared to a quantity of available nonvolatile memory blocks in the data storage device. The method wherein determining the health parameters comprises: determining an erase fail count based on a quantity of nonvolatile memory blocks in the data storage device added to a defect list in response to an erase failure of a nonvolatile memory block compared to a quantity of available nonvolatile memory blocks in the data storage device. The method wherein determining the health parameters comprises: determining a drive life metric based on a proportion of a current longevity of the data storage device to a warrantied life of the data storage device that includes the nonvolatile memory block. The method further comprising: managing a plurality of data storage devices in a composable infrastructure; determining the failure index for each data storage device of the plurality of data storage devices; comparing the failure index for each data storage device of the plurality of data storage devices to the threshold; and selectively bypassing, responsive to the failure index of at least one data storage device of the plurality of data storage devices being greater than the threshold, the at least one storage device during a decomposition event.

Still another general aspect includes a system including: a plurality of nonvolatile memory blocks in a data storage device; means for receiving a command to securely erase at least one nonvolatile memory block of a plurality of memory blocks in a data storage device; means for determining health parameters of the at least one nonvolatile memory block, where the health parameters are indicative of usage information of the at least one nonvolatile memory block; means for calculating a failure index that the at least one nonvolatile memory block will be securely erased; and in response to the failure index being less than a threshold, means for executing the command to securely erase the at least one nonvolatile memory block.

The various embodiments advantageously apply the teachings of storage networks and/or storage systems to improve the functionality of such computer systems. The various embodiments include operations to determine, while decomposing a storage system in a composable infrastructure, whether the storage system should be reused in a subsequent composable infrastructure based on a predicted ability of the data stored on the storage system to be securely erased to avoid compromising the data from a previously composed infrastructure. That is, the various embodiments disclosed herein include hardware and/or software with functionality to improve decision of whether to compose a subsequent infrastructure using a storage system. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

In the era of cloud computing, the fundamental architecture of data centers is rapidly changing. Further, applications are being hosted at data centers which run on cloud-based services. These hosted applications may include "Platform as a Service (PaaS)", "Infrastructure as a Service (IaaS)" and "Software as a Service (SaaS)". Such hosted applications challenge the fundamentals of data-center architectures in both hardware and software requiring data centers to adapt to keep up with the special requirements of hosted applications including on-demand applications. Since hosted applications may run as on-demand applications, the data centers do not allocate dedicated hardware, but instead, allocate and compose infrastructure (e.g., processors, storage, etc.) as needed. Such an architecture has become known as "composable infrastructure," and are designed for composable disaggregated infrastructure markets.

The characteristic of composable infrastructure is that resources (e.g., central processing unit (CPU), memory, network or storage) may be composed and de-composed many times as per the application needs. While the hardware may be reused by various applications, the residual sensitive data on resources such as data stored on storage media, cannot be compromised responsive to the storage resource being recomposed in a subsequent infrastructure. Since in a composable infrastructure deployment, the data storage resources may be reused across many different multitenant applications, the data may be subject to compromise in a subsequent configuration accessible by different end users. Accordingly, protection of the user-data before the storage media (e.g., solid state drives (SSDs)) gets decomposed and composed again to deploy from one application to another is of great importance.

Further, storage media, such as nonvolatile memory (NVM) (e.g., solid state drives) exhibit a lifecycle restricted by a quantified number of data writes to the media. Responsive to the media approaching the end of its lifecycle, the media may not be capable of having the existing data securely erased by overwriting. Further, the media may not be eligible for recomposing into a subsequent composable architecture when the write-reliability of the media is at its end of life. Prediction of such conditions assists in the determination to retire the portion of the media that is approaching the end of its life expectancy.

Figure 1A:
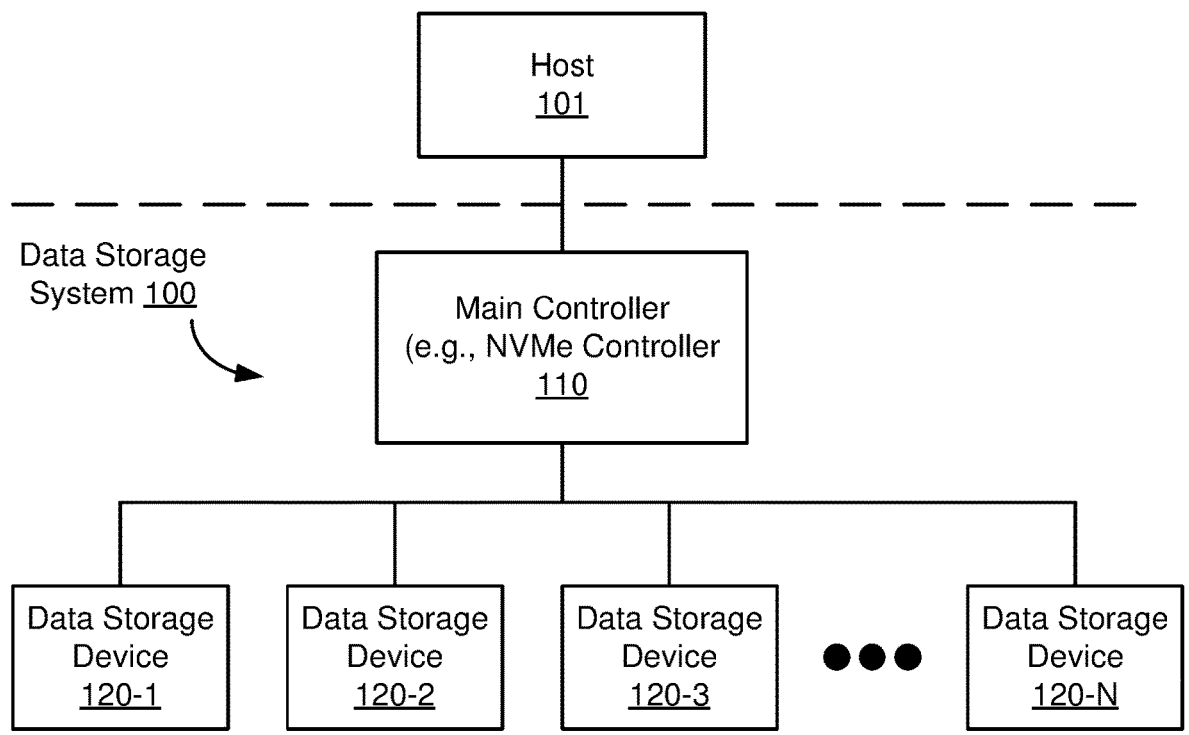
FIG. 1A schematically illustrates a data storage system for storing and retrieving data in data storage devices.
Figure 1B:
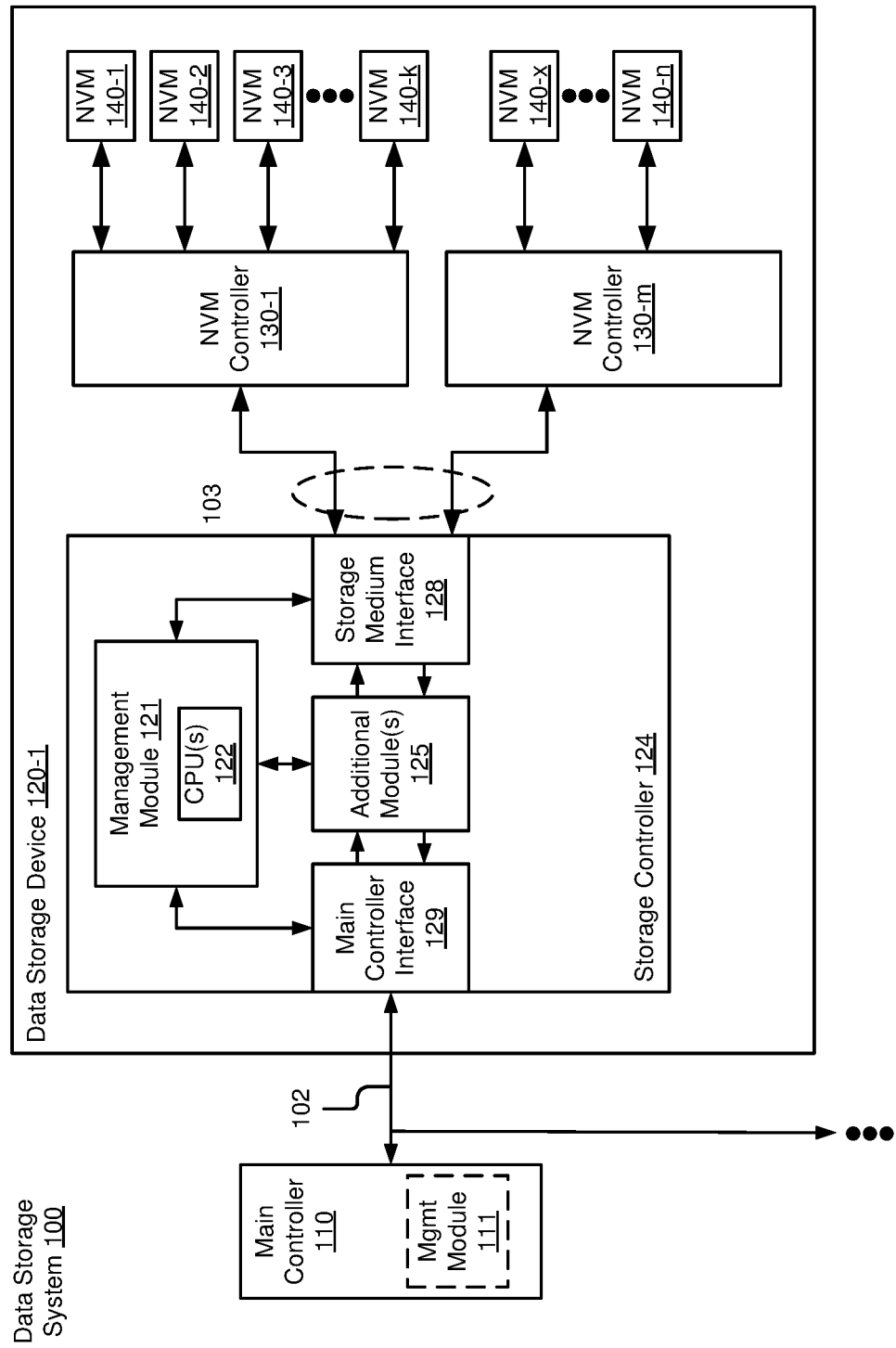
FIG. 1B schematically illustrates a storage device in a data storage system for storing and retrieving data in data storage devices.

FIGS. 1A-1B are block diagrams illustrating data storage system 100, in accordance with some embodiments. While some example features are illustrated, various other features have not been illustrated for the sake of brevity and so as not to obscure pertinent aspects disclosed herein. In one implementation, a data storage system 100 includes one or more data storage devices 120 (also sometimes called information storage devices, storage devices, or memory devices). Each data storage device 120 includes a storage controller 124 and non-volatile memory (e.g., one or more NVM device(s) 140 such as one or more flash memory devices), which are used in conjunction with a main controller 110 (e.g., a nonvolatile memory express (NVMe) controller). In some embodiments, storage device includes one or more non-volatile memory (NVM) controllers 130 such as flash controllers or channel controllers (e.g., for data storage devices having NVM devices in multiple memory channels), while in other embodiments the NVM devices are controlled by storage controller 124 without intervening NVM controllers 130.

In some embodiments, data storage device 120 includes a single NVM device while in other embodiments data storage device 120 includes a plurality of NVM devices. In some embodiments, NVM devices 140 include NAND-type flash memory or NOR-type flash memory. Further, in some embodiments, NVM controllers 130, when included in data storage device 120, are solid-state drive (SSD) controllers. However, other types of storage media may be included in accordance with aspects of a wide variety of embodiments. In some embodiments, a flash memory device includes one or more flash memory die, one or more flash memory packages, one or more flash memory channels or the like.

Main controller 110 is coupled to the storage controller 124 through data connections 102. However, in some embodiments, main controller 110 includes storage controller 124, or a portion of storage controller 124, as a component and/or a subsystem. For example, in some embodiments, some or all of the functionality of storage controller 124 is implemented by software executed on main controller 110. Main controller 110 is sometimes called a controller system, an NVMe controller, garbage collection (GC) leader, or storage virtualization controller. In some embodiments, a storage controller 124 or NVM controller 130 associated with a particular data storage device (e.g., 120-1) acts as a main controller 110 for other data storage devices (e.g., 120-2, 120-3, and 120-N) in data storage system 100. In some embodiments, main controller 110 is a component and/or subsystem of host 101 (described below).

In some embodiments, host 101 may be coupled to data storage system 100 through a host interface of main controller 110. In some embodiments, multiple hosts 101 (only one of which is shown in FIG. 1A) are coupled to data storage system 100 through a host interface of main controller 110, which may be a storage network interface or other interface capable of supporting communications with multiple hosts 101.

Host 101, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 101 is sometimes called a host system, client, or client system. In some embodiments, host 101 is a server system, such as a server system in a data center. In some embodiments, the one or more hosts 101 are one or more host devices distinct from the main controller 110 and distinct from the plurality of storage devices 120; but in some other embodiments, the one or more hosts 101 may include one of the data storage devices 120 that has been configured to perform data processing operations and to send data storage commands to access data stored in the one or more data storage devices 120. In some other embodiments, the one or more hosts 101 are configured to store and access data in the plurality of data storage devices 120.

The one or more NVM controllers 130, when included in a respective data storage device 120, are coupled with storage controller 124 through connections 103. Connections 103 are sometimes called data connections, but typically convey commands in addition to data, and optionally convey metadata, error correction information and/or other information in addition to data values to be stored in NVM devices 140 and data values read from NVM devices 140. In some embodiments, however, storage controller 124, the one or more NVM controllers 130, and NVM devices 140 are included in the same device (i.e., an integrated device) as components thereof. Furthermore, in some embodiments, one or more of the data storage devices 120 (e.g., including storage controller 124, the one or more NVM controllers 130, and NVM devices 140) are embedded in a host device (e.g., main controller 110 or host 101), such as a mobile device, tablet, other computer or computer-controlled device, and the methods described herein are performed, at least in part, by the embedded storage controller. In some embodiments, storage controller 124 is configured to control, and is directly coupled to, one or more NVM devices 140, rendering one or more (or all) of the NVM controllers 130 optional or unnecessary.

In some embodiments, a data storage device 120 includes NVM devices 140 such as flash memory devices (e.g., NVM devices 140-1 through 140-$k$, and NVM devices 140-$x$ through 140-$n$) and NVM controllers 130 (e.g., NVM controllers 130-1 through 130-$m$). Viewed another way, a data storage device 120 includes m memory channels, each of which has an NVM controller 130 and a set of NVM devices 140 coupled to the NVM controller 130, where m is an integer greater than one. However, in some embodiments, two or more memory channels share an NVM controller 130. In either example, each memory channel has its own distinct set of NVM devices 140. In a non-limiting example, the number of memory channels in a typical storage device is 8, 16, or 32. In another non-limiting example, the number of NVM devices 140 per memory channel is typically 8, 16, 32, or 64. Furthermore, in some embodiments, the number of NVM devices 140 is different in different memory channels.

In some embodiments, each NVM controller of NVM controllers 130 includes one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. NVM devices 140 are coupled to NVM controllers 130 through connections that typically convey commands in addition to data, and optionally convey metadata, error correction information and/or other information in addition to data values to be stored in NVM devices 140 and data values read from NVM devices 140. NVM devices 140 may include any number (i.e., one or more) of memory devices including, without limitation, non-volatile semiconductor memory devices, such as flash memory device(s).

For example, flash memory device(s) (e.g., NVM devices 140) can be configured for enterprise storage suitable for applications such as cloud computing, for datastore applications, primary and/or secondary storage, or for caching data stored (or to be stored) in secondary storage, such as hard disk drives. Additionally and/or alternatively, flash memory device(s) (e.g., NVM devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, NVM devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

In some embodiments, storage controller 124 includes a management module 121, a main controller interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Main controller interface 129 provides an interface to main controller 110 through data connections 102. Similarly, storage medium interface 128 provides an interface to non-volatile memory (via NVM controllers 130, when included in storage device 120) though connections 103. In some embodiments, storage medium interface 128 includes read and write circuitry, including circuitry capable of providing reading signals to NVM controllers 130 (e.g., reading threshold voltages for NAND-type flash memory) or to NVM device 140 when storage device 120 does not include NVM controllers. In some embodiments, connections 102 and connections 103 are implemented as a communication media over which commands and data are communicated, using a protocol such as NVMe, double data rate type 3 (DDR3), small computer system interface (SCSI), serial advanced technology attachment (SATA), serial attached SCSI (SAS), or the like.

In some embodiments, management module 121 includes one or more processing units 122 (sometimes herein called CPUs, processors, or hardware processors, and sometimes implemented using microprocessors, microcontrollers, or the like) configured to execute instructions in one or more programs (e.g., in management module 121). In some embodiments, the one or more CPUs 122 are shared by one or more components within, and in some cases, beyond the function of storage controller 124. Management module 121 is coupled to main controller interface 129, additional module(s) 125 and storage medium interface 128 to coordinate the operation of these components. In some embodiments, one or more modules of management module 121 are implemented in management module 111 of main controller 110. In some embodiments, one or more processors of main controller 110 (not shown) are configured to execute instructions in one or more programs (e.g., in management module 111). In some embodiments, management module 111 is coupled to data storage device(s) 120 to manage the operation of data storage device(s) 120.

Additional module(s) 125 are coupled to storage medium interface 128, main controller interface 129, and management module 121. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121; in other embodiments, additional module(s) 125 are implemented in whole or in part using special purpose circuitry (e.g., to perform encoding and decoding functions). In some embodiments, additional module(s) 125 are implemented in whole or in part by software executed on main controller 110.

In some embodiments, during a write operation, main controller interface 129 receives data to be stored in NVM devices 140 from main controller 110. The data received by main controller interface 129 is made available to an encoder (e.g., in additional module(s) 125), which encodes the data to produce one or more codewords. The one or more codewords are made available to storage medium interface 128, which transfers the one or more codewords to NVM devices 140 (e.g., through NVM controllers 130) in a manner dependent on the type of storage medium being utilized.

In some embodiments, a read operation may be initiated in response to main controller 110 sending one or more read commands (e.g., via data connections 102, or alternatively a separate control line or bus) to storage controller 124 requesting data from NVM devices 140. The one or more read commands, sometimes called host read commands, are typically initiated by (and thus received by main controller 110 from) a host 101, but in some circumstances one or more of the read commands can be initiated by an application or process running on in of the storage devices 120-1 to 120-N (see FIG. 1A). Storage controller 124 sends one or more read access commands to NVM devices 140 (e.g., through NVM controllers 130), via storage medium interface 128, to obtain raw read data in accordance with memory locations (addresses) specified by the one or more read commands. The read access commands correspond to the read commands, but the read commands are converted by storage controller 124 into read access commands, for example so as to be directed to one or more specific NVM device 140.

As explained above, a storage medium (e.g., NVM devices 140) is divided into a number of addressable and individually selectable blocks and each block is optionally (but typically) further divided into a plurality of pages and/or word lines and/or sectors. While erasure of data from a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, an MLC NAND has two-page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and single-level cell (SLC) as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or error correction code (ECC)) is a choice made in response to data being actually written to the storage media.

As an example, in response to data being written to a storage medium in pages where the storage medium is erased in blocks, pages in the storage medium may contain invalid (e.g., stale) data, but those pages cannot be overwritten until the whole block containing those pages is erased. To write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140 in storage device 120) is a multiple of the logical amount of data written by a host (e.g., host 101, or main controller 110, sometimes called a host) to the storage medium. As discussed above, in response to a nonvolatile memory block of storage medium needing to be erased before it can be re-written, the garbage collection process performs these operations resulting in re-writing data one or more times. This multiplying effect increases the number of writes required over the life of a storage medium, which shortens the time it can reliably operate. The formula to calculate the write amplification metric of a storage system is given by equation:

(amount of data written to a storage medium)/
(amount of data written by a host).

One of the goals of any flash memory-based data storage system architecture is to reduce write amplification as much as possible so that available endurance is used to meet storage medium reliability and performance specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Figure 2:
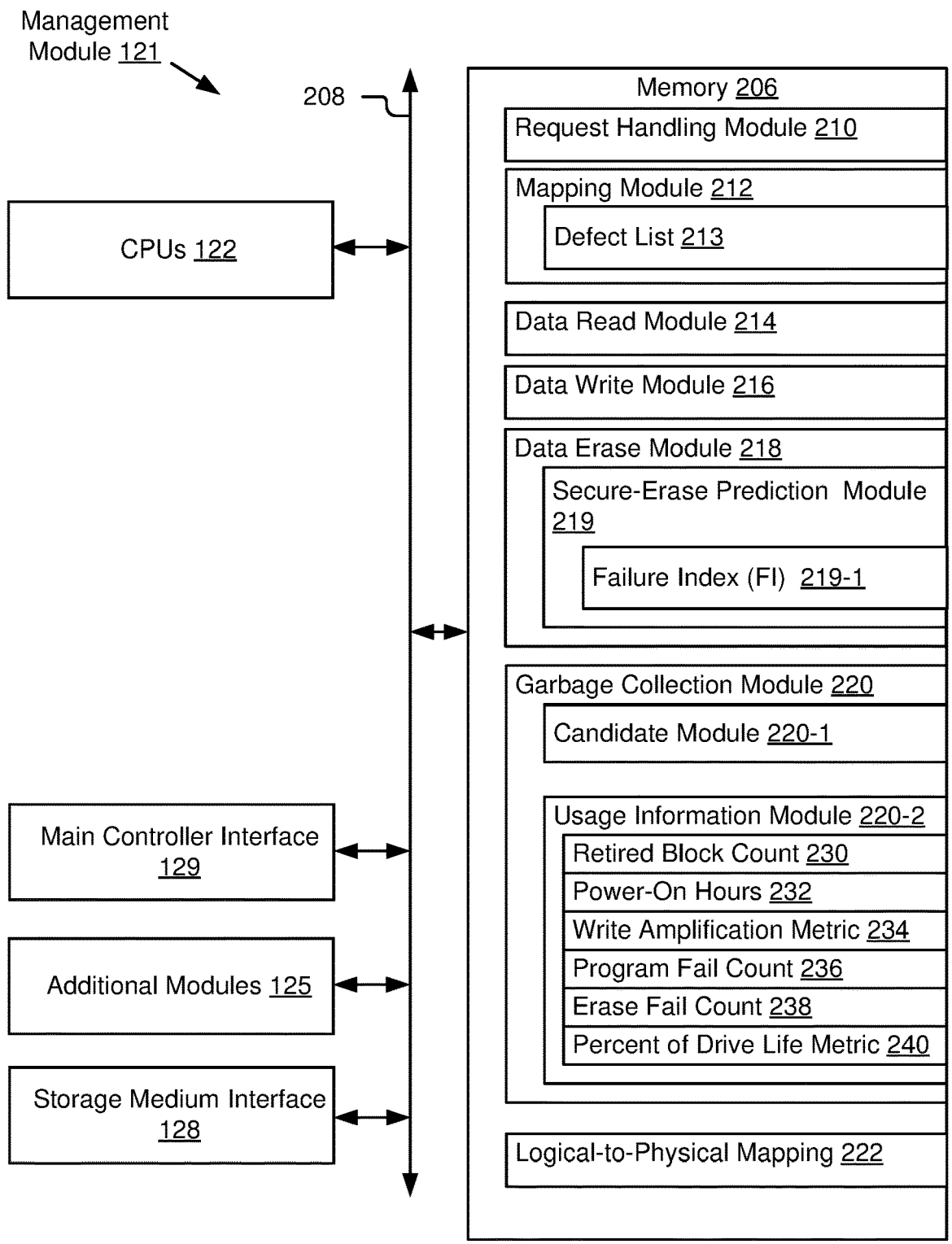
FIG. 2 schematically illustrates implementations of a management module for securely erasing data in a data storage system.

FIG. 2 is a block diagram illustrating a management module 121, in accordance with some embodiments, as shown in FIG. 1B. Management module 121 typically includes one or more processing units 122 (sometimes herein called CPUs, processors, or hardware processors, and sometimes implemented using microprocessors, microcontrollers, or the like) for executing modules, programs, and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121 is coupled to main controller interface 129, additional module(s) 125, and storage medium interface 128 by the one or more communication buses 208. Memory 206 includes high-speed random-access memory, such as dynamic random access memory (DRAM), static random access memory (SRAM), double data rate (DDR) random access memory (RAM), or other random-access solid-state memory devices, and may include non-volatile memory, such as one or more magnetic disk storage devices, optical disk storage devices, flash memory devices, or other non-volatile solid state storage devices. Memory 206 optionally includes one or more storage devices remotely located from CPU(s) 122. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- request handling module 210 for receiving input/output (I/O) requests from a host or main controller (e.g., write requests and/or read requests, sometimes called write command and read commands, or host write commands and host read commands). The request handling module 210 may also handle a decompose infrastructure process upon the completion of a lifecycle of a cloud computing application. The request handling module may also be configured to determine if the infrastructure being decomposed includes one or more nonvolatile memory blocks. The request handling module further provides a means for receiving a command to securely erase at least one nonvolatile memory block of a plurality of memory blocks in a data storage device;
- mapping module 212 for mapping logical addresses to physical addresses using logical-to-physical mapping 222. The mapping module 212 may also maintain a defect list 213 of bad or damaged nonvolatile memory blocks;
- data read module 214 data for reading data, or causing data to be read, from storage device 120 (e.g., NVM devices 140);
- data write module 216 for writing data, or causing data to be written, to storage device 120 (e.g., NVM devices 140);
- data erase module 218 for erasing data, or causing data to be erased, from storage device 120 (e.g., NVM devices 140). The data erase module further provides a means for retrieving health parameters of the at least one nonvolatile memory block, the health parameters indicative of usage information of the at least one nonvolatile memory block;
  - secure-erase prediction module 219 for predicting whether a block of data storage devices is likely to be erased/sanitized to enable the block to be capable of being composed into a subsequent composable infrastructure. The secure-erase prediction module 219 may further include a failure index (FI) 219-1. The secure erase module further provides a means for calculating a failure index that the at least one nonvolatile memory block will be securely erased;
- garbage collection module 220 for performing a garbage collection process on one or more memory portions (i.e., blocks) of storage device 120 (e.g., NVM devices 140). The garbage collection module may securely erase the at least one nonvolatile memory block to either make the nonvolatile memory block available for use in a subsequent or future composition, or securely erase the at least one nonvolatile memory block prior to retiring the memory block based on various lifecycle factors. The garbage collection module may further provide, in response to the failure index being less than a threshold, means for executing the command to securely erase the at least one nonvolatile memory block;

candidate module 220-1 for identifying memory devices (e.g., NVM devices 140) as candidates for management operations (e.g., garbage collection);

usage information module 220-2 for collecting usage information of memory devices (e.g., NVM devices 140) including one or more of a retired block count 230, power-on hours 232, write amplification metric 234, program fail count 236, erase fail count 238, and percent of drive life metric 240; and logical-to-physical mapping 222 storing a logical-to-physical map (used, for example, by mapping module 212), which maps logical addresses recognized by the host (e.g., main controller 110 and/or host 101, FIGS. 1A-1B) to physical addresses of storage device 120 (e.g., NVM devices 140).

More specifically and in some embodiments, the secure-erase prediction module 219 may be configured to receive a command to securely erase at least one nonvolatile memory block of the plurality of nonvolatile memory blocks. For example, the command may include an NVMe "secure-erase" command that enables storage drives to erase user data from the data storage device. In some examples, the "secure-erase" command deletes the mapping table for the drive, but does not wipe the data from the blocks that contain the data. In other embodiments, the command may include an NVMe "sanitize" command that not only removes the map, but also erases the data from all of the blocks that have been written to.

The secure-erase prediction module 219 is further configured to retrieve health parameters of the at least one nonvolatile memory block. The health parameters indicative of usage information or a use history of the at least one nonvolatile memory block of storage. The health parameters are stored in the usage information module 220-2 and may include a retired block count 230, power-on hours 232, write amplification metric 234, program fail count 236, erase fail count 238, and percent of drive life metric 240. In one embodiment, the secure-erase prediction module 219 is configured to retrieve a retired block count based on a proportion of retired blocks to a quantity of available nonvolatile memory blocks in the data storage device. In another embodiment, the secure-erase prediction module 219 is configured to retrieve a power-on ratio based on a proportion of a quantity of hours the nonvolatile memory block has been powered-on and a warrantied quantity of powered hours for the nonvolatile memory block in the data storage device. In another embodiment, the secure-erase prediction module 219 is configured to retrieve a write amplification metric based on a proportion of times the nonvolatile memory block of storage in the data storage device was written to and read from.

In another embodiment, the secure-erase prediction module 219 is configured to retrieve a program fail ratio based on a proportion of a quantity of nonvolatile memory blocks in the data storage device added to a defect list in response to a programming failure of a nonvolatile memory block in the data storage device compared to a quantity of available nonvolatile memory blocks in the data storage device. In another embodiment, the secure-erase prediction module 219 is configured to retrieve an erase fail count based on a quantity of nonvolatile memory blocks in the data storage device added to a defect list in response to an erase failure of a nonvolatile memory block compared to a quantity of available nonvolatile memory blocks in the data storage device. In another embodiment, the secure-erase prediction module 219 is configured to retrieve a drive life metric based on a proportion of a current longevity of the data storage device to a warrantied life of the data storage device that includes the nonvolatile memory block.

The secure-erase prediction module 219 is further configured to calculate a failure index that the at least one nonvolatile memory block will be securely erased. As stated, composable infrastructure may be composed and de-composed many times as per the application need. While the hardware may be reused by various applications, the residual sensitive data on resources such as data stored on storage media, cannot be compromised as a result of the storage resource being recomposed in a subsequent infrastructure. Since in a composable infrastructure deployment, the data storage resources may be reused across many different multitenant applications, the data may be subject to compromise in a subsequent configuration accessible by different end users. Accordingly, protection of the user-data before the storage media (e.g., solid state drives) gets decomposed and composed again to deploy from one application to another is of great importance.

While securely erasing data may appear trivial, erasing data from data storage devices that are nonvolatile memory devices exacerbates life cycle issues and may result in the storage media being unreliable for inclusion in a subsequent composable architecture that includes the data storage device. Accordingly, the media may not be eligible for recomposing into a subsequent composable architecture when the write-reliability of the media is at its end of life. Prediction of such conditions assists in the determination to retire the portion of the media that is approaching the end of its life expectancy.

In some embodiments, a secure-erase predictability is determined by calculating a metric, known herein as a failure index (FI). The failure index is based on calculations performed on the health parameters. The failure index of a data storage device is determined by assigning relative weights to each of the health parameters. In one example, the relative weights or weightage rating ($WI_i$) may be a value between 1 to 10 with the relativity based on a criticality of various ones of the specific health parameters with, for example, a value of 10 being a more critical parameter and a value of 1 being a less critical parameter. Table I illustrates specific assignments that will be used for an example. The various weightings are tunable.

TABLE 1

Weightage scale rating for events.

| No. | Event | Weightage rating ($WI_i$) |
|---|---|---|
| 1. | Retired block count | 7 |
| 2. | Power-On-Hours | 4 |
| 3. | Write-Amplification | 2 |
| 4. | Program Fail Count | 8 |
| 5. | Erase Fail Count | 10 |
| 6. | Percent of Drive Life. | 5 |

In some embodiments, the failure index is further characterized by a range value ($RI_i$) depending on a percentage measure of the of the health parameters, as shown in Table II. The various ranges are tunable.

TABLE II

Classification of range values (RI$_i$) from normal to critical based on % of occurrence.

| No. | Event Name | Normal range in % | Moderate range in % | Severe range in % | Critical range in % |
|---|---|---|---|---|---|
| 1. | Retired block count | 0-0.25 | 0.26-0.50 | 0.51-0.75 | 0.76-100 |
| 2. | Power-On-Hours | 0-0.20 | 0.21-0.40 | 0.41-0.60 | 0.61-100 |
| 3. | Write-Amplification | 0-0.30 | 0.31-0.60 | 0.60-0.90 | 0.90-100 |
| 4. | Program Fail Count | 0-0.25 | 0.26-0.50 | 0.51-0.75 | 0.76-100 |
| 5. | Erase Fail Count | 0-0.40 | 0.41-0.61 | 0.61-0.81 | 0.81-100 |
| 6. | Percent of Drive Life. | 0-0.20 | 0.21-0.40 | 0.41-0.60 | 0.61-100 |

In some embodiments, the range values may be measured dynamically at runtime.

A failure index (FI) may be calculated by:

$$TIi = \frac{WI_i}{\sum_{i=1}^{n} WI_i}$$

$$FI = \sum_{i=1}^{n} (TIi * RIi)$$

where FI = Failure index percentage,

WI$_i$ = Weightage index for events, TIi = Average of WI for $i$ events,

RI$_i$ = Range value for event occurrence.

By way of example, an Example 1 is illustrated below where all of the various range of events (RI$_i$) are present in the data storage device (e.g., SSD) as shown below. An example calculation is illustrated below, where:

Example 1

| No. | Event Name | Normal range in % | Moderate range in % | Severe range in % | Critical range in % |
|---|---|---|---|---|---|
| 1. | Retired block count | 0.10 | 0 | 0 | 0 |
| 2. | Power-On-Hours | 0 | 0 | 0 | 0.61 |
| 3. | Write-Amplification | 0 | 0 | 0.6 | 0 |
| 4. | Program Fail Count | 0.15 | 0 | 0 | 0 |
| 5. | Erase Fail Count | 0.10 | 0 | 0 | 0 |
| 6. | Percent of Drive Life. | 0 | 0.22 | 0 | 0 |

| No. | Event | Weightage rating | $TIi = \dfrac{WI_i}{\sum_{i=1}^{n} WI_i}$ |
|---|---|---|---|
| 1. | Retired block count | 7 | 7/36 = 0.194 |
| 2. | Power-On-Hours | 4 | 4/36 = 0.111 |
| 3. | Write-Amplification | 2 | 2/36 = 0.055 |
| 4. | Program Fail Count | 8 | 8/36 = 0.222 |
| 5. | Erase Fail Count | 10 | 10/36 = 0.277 |
| 6. | Percent of Drive Life. | 5 | 5/36 = 0.138 |

$$FI = \sum_{i=1}^{n}(TIi * RIi)$$

FI=[(0.194*0.10)+(0.111*0.61)+(0.055*0.6)+ (0.222*0.15)+(0.277*0.10)+(0.138*0.22)]

FI=[0.0194+0.06771+0.033+0.0333+0.0277+ 0.03036]

FI=0.21147*100=21.147%

Accordingly, the resulting failure index (FI)=21.147% which represents a prediction of a "secure-erase" format failure with a current health of data storage device (e.g., SSD).

By way of another example, an Example 2 is illustrated where all of the various range of events (RI$_i$) are present in the data storage device (e.g., SSD) as shown below. An example calculation is illustrated below, where:

Example 2

| No. | Event Name | Normal range in % | Moderate range in % | Severe range in % | Critical range in % |
|---|---|---|---|---|---|
| 1. | Retired block count | 0 | 0 | 0 | 0.9 |
| 2. | Power-On-Hours | 0 | 0 | 0 | 0.9 |
| 3. | Write-Amplification | 0 | 0 | 0 | 0.9 |
| 4. | Program Fail Count | 0 | 0 | 0 | 0.9 |
| 5. | Erase Fail Count | 0 | 0 | 0 | 0.9 |
| 6. | Percent of Drive Life. | 0 | 0 | 0 | 0.9 |

| No. | Event | Weightage rating | $TIi = \dfrac{WI_i}{\sum_{i=1}^{n} WI_i}$ |
|---|---|---|---|
| 1. | Retired block count | 7 | 7/36 = 0.194 |
| 2. | Power-On-Hours | 4 | 4/36 = 0.111 |
| 3. | Write-Amplification | 2 | 2/36 = 0.055 |
| 4. | Program Fail Count | 8 | 8/36 = 0.222 |

| No. | Event | Weightage rating | $Tli = \dfrac{WI_i}{\sum_{i=1}^{n} WI_i}$ |
|---|---|---|---|
| 5. | Erase Fail Count | 10 | 10/36 = 0.277 |
| 6. | Percent of Drive Life. | 5 | 5/36 = 0.138 |

$FI = \sum_{i=1}^{n}(Tli * Rli)$ $FI=[(0.194*0.90)+(0.111*0.90)+(0.055*0.90)+ (0.222*0.90)+(0.277*0.90)+(0.138*0.90)]$ $FI=[0.1746+0.0999+0.0495+0.1998+0.2493+0.1242]$ $FI=0.8973*100=89.73\%$ Accordingly, the resulting failure index (FI)=89.73% which, when compared to a threshold, represents a prediction of a "secure-erase" format failure with the current health of a data storage device (e.g., SSD). For example, secure-erase prediction module 219 may be configured with one or more threshold values corresponding to critical risk levels of the failure index. In some embodiments, thresholds for determining whether a nonvolatile memory block and/or data storage device have become too unreliable to risk using in a current or future secure erase function may be a configurable parameter set by a user or system administrator. For example, secure-erase prediction module 219 may be configured with a default threshold of 50% reliability for completing the secure erase function, but may accept custom threshold parameter values for the composable infrastructure and/or any subcomponents thereof. In some embodiments, multiple thresholds may be configured for different responses and contexts, such as during normal operation of the data storage device (such as a host or end-user secure erase command) as compared to the secure erase command that may accompany decomposing, recomposing, or other provisioning of the data storage device.

In summary, generating the above examples of the generation of a failure index of a data storage device (e.g., SSD) enables the management module 121 or the main controller 110 to determine whether to proceed with a "secure-erase" format or to go with hot swap of the data storage device. Accordingly, the predictive approach described herein enable a decision, based on the calculated failure index, to be made regarding the health of the data storage device. Specifically, a determination may be made as to whether to retain the data storage device in a pool of data storage devices for future composition in a composable infrastructure, or to predictively retire the data storage device without identifying the lack of health in the data storage device during a subsequent composition of a composable infrastructure. Stated another way, the calculation of the failure index enables action to be immediately taken regarding the data storage device, rather than identifying the unhealthy status of the data storage device at the end of a secure-erase process.

In other embodiments, other health parameters in lieu of or in addition to the example health parameters described herein may be used in the calculation of the failure index.

The secure-erase prediction module 219 is further configured to, in response to the failure index being less than a threshold, execute the command to securely erase the at least one nonvolatile memory block. In one example, the command may be an NVMe "secure-erase" command. In another example, the command may be an NVME "sanitize" command.

The secure-erase prediction module 219 is further configured to, in response to the failure index being greater than the threshold: complete the command to securely erase the at least one nonvolatile memory block, and retire the at least one nonvolatile memory block.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described herein. In some embodiments, some or all of these modules may be implemented with specialized hardware circuits that subsume part or all of the module functionality.

Although FIG. 2 shows a management module 121, FIG. 2 is intended more as functional description of the various features which may be present in a management module than as a structural schematic of the embodiments described herein. In practice, and as recognized by those of ordinary skill in the art, items shown separately could be combined and some items could be separated. In some embodiments, one or more of the operations and/or modules of management module 121 may instead be performed and/or implemented by management module 111. In some embodiments, one or more of the operations and/or modules of management module 121 may instead be performed and/or implemented by NVM controllers 130. For example, each NVM controller includes garbage collection logic (e.g., similar to garbage collection module 220, FIG. 2) for managing data lifetime of corresponding NVM devices. In some embodiments, garbage collection module 220 may be implemented in whole or in part by software, hardware, firmware, or any combination thereof in data storage system 100 (FIGS. 1A-1B). Lifetime management operations may include, for example, garbage collection operations, data compaction operations, read handling operations, and data scrubbing operations.

Figure 3:
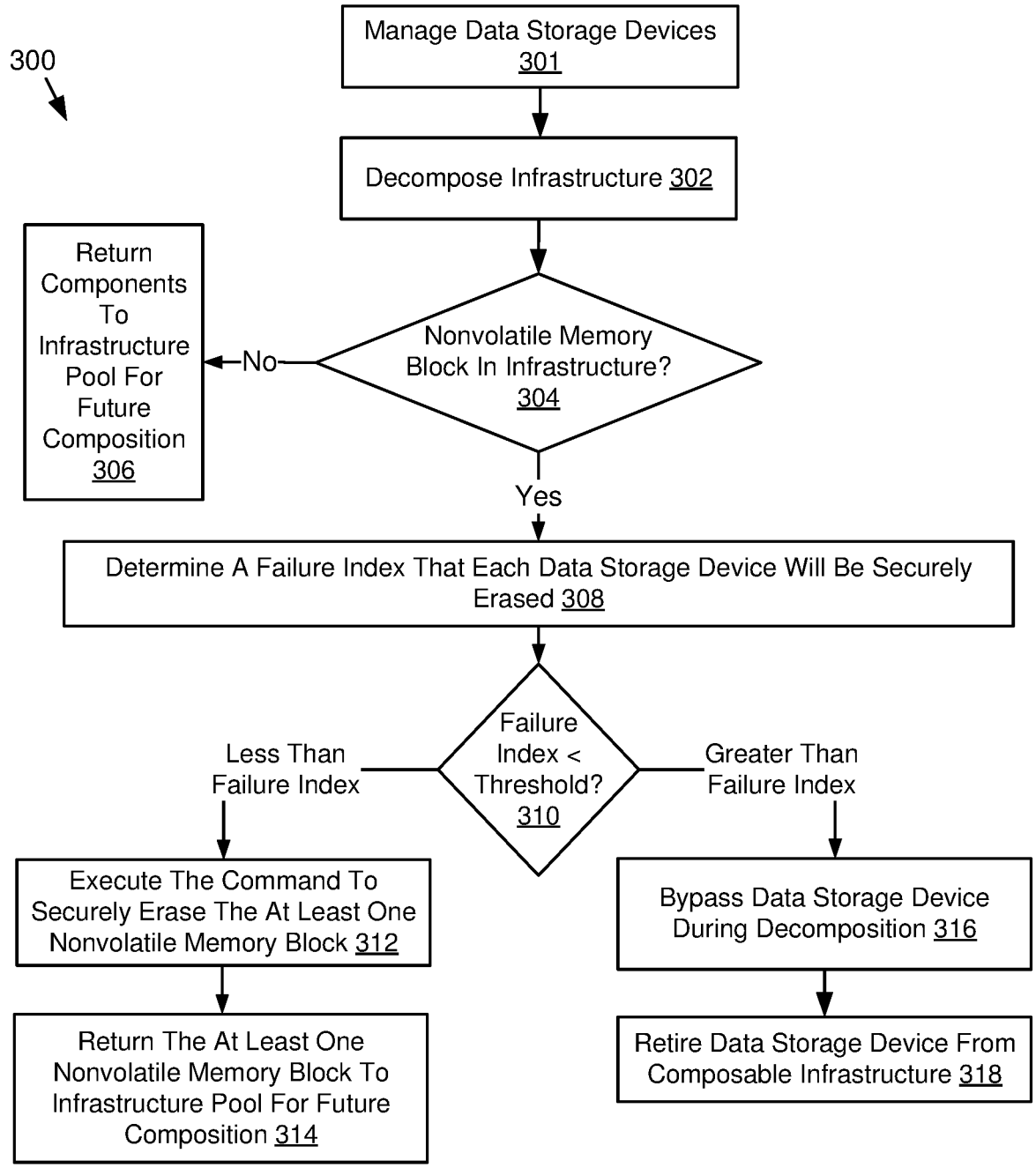
FIG. 3 is a flowchart of an example method for decomposing a composable infrastructure based on analysis of nonvolatile memory blocks.

FIG. 3 is a flowchart of an example method for 300 for a management module to decompose a composable infrastructure based on analysis of nonvolatile memory blocks. For example, the management module may be configured in a main controller, such as main controller 110 in FIGS. 1A-1B, for decomposing and recomposing a set of data storage devices, such as data storage devices 120-1-120-N.

At block 301, the management module may be configured to manage data storage devices in a composable infrastructure. For example, the management module may determine which data storage devices connected to the management module are eligible for decomposition and recomposition for reallocation in the composable infrastructure during a decomposition event (where the management module has received instructions to decompose the storage devices under its control for reallocation).

At block 302, the management module may be configured to decompose infrastructure upon the completion of the use of the composable infrastructure. The determination may be made by a host, such as at the completion of the lifecycle of a cloud computing application.

At a block 304, the management module determines if the infrastructure being decomposed includes one or more nonvolatile memory blocks. If the infrastructure does not include one or more nonvolatile memory blocks, then a block 306 returns the components of the infrastructure to an infrastructure pool for reuse of the components in future or subsequent composition.

In response to the block 304 determining that one or more nonvolatile memory blocks are present in the infrastructure being decomposed, at a block 308, the management module determines or calculates a failure index (FI) for each data storage device (and/or the nonvolatile memory blocks contained therein) in the infrastructure being decomposed. The specifics of the calculation of the failure index (FI) are described below with respect to FIG. 4.

At a block 310, the management module compares the failure index (FI) against a threshold. The threshold may be determined based on the various factors described below with respect to FIG. 4.

In response to the block 310 determining the failure index (FI) to be less than the threshold, at a block 312, the management module executes the command to securely erase the at least one nonvolatile memory block in the data storage device, and at a block 314, the management module returns the at least one nonvolatile memory block to the infrastructure pool for subsequent or future composition.

In response to the block 310 determining the failure index (FI) to be greater than the threshold, at a block 316, the management module bypasses the data storage device and/or at least one nonvolatile memory block during the decomposition process and at a block 318, the management module retires the data storage device and/or at least one nonvolatile memory block based on a predicted unreliability of the nonvolatile memory block in subsequent or future compositions. In some embodiments, the management module may mark the data storage device and/or at least one nonvolatile memory for later secure erase, or at least attempted secure erase. In some embodiments, data storage devices that have been identified as unreliable for secure erase may be removed from the data storage system and/or composable infrastructure and/or may be replaced with a new data storage device.

Figure 4:
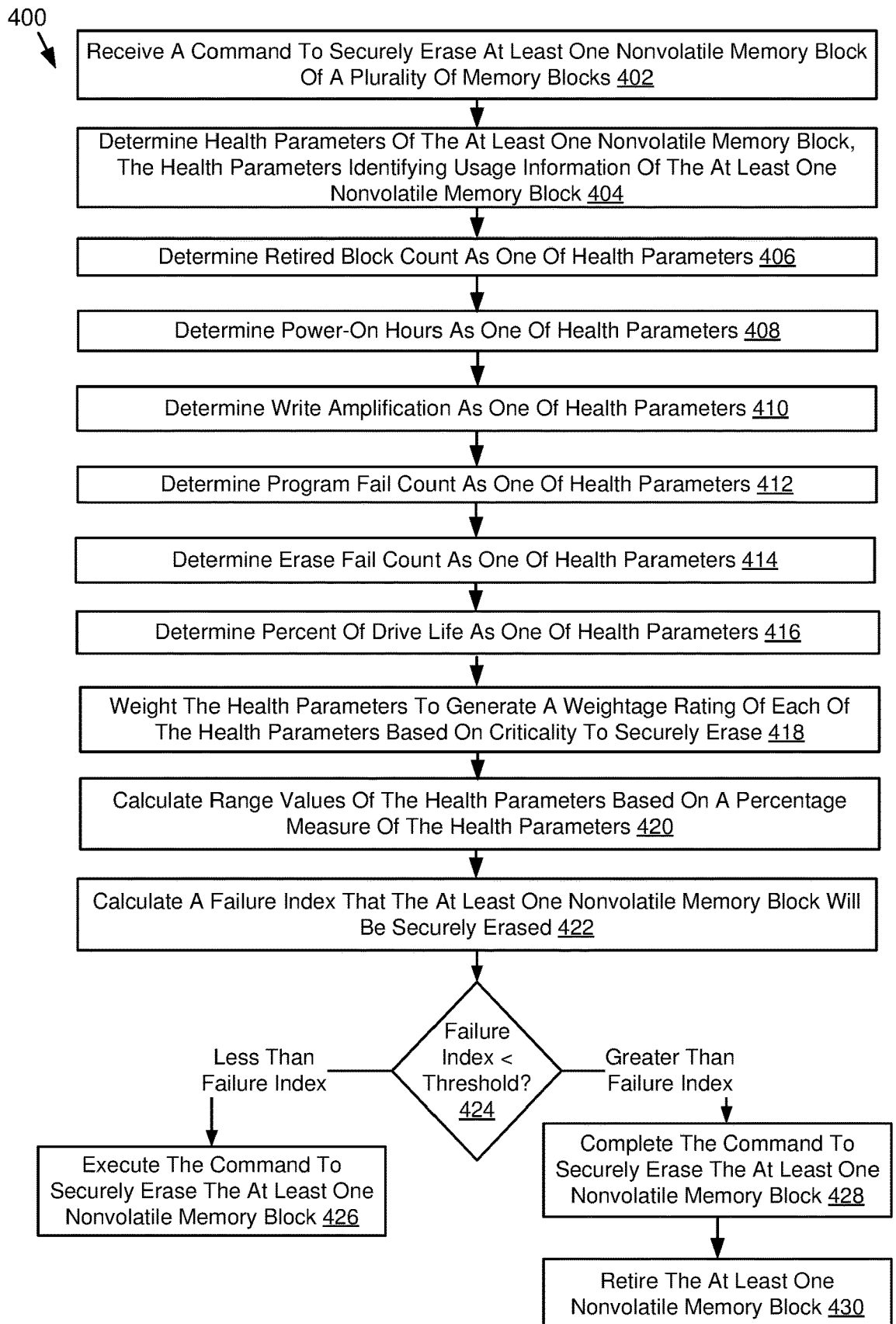
FIG. 4 is a flowchart of an example method of predicting whether a nonvolatile memory block is likely capable of being securely erased to be eligible for composing into another composable infrastructure without compromising data previously stored in the nonvolatile memory block.

FIG. 4 illustrates a flowchart of a method 400 for a management module in a data storage system 100 to predict the likelihood of a data storage device being capable of completing a secure-erase of one or more nonvolatile memory blocks in a data storage device according to the blocks 402-430.

At block 402, the management module may be configured to receive or determine a command to securely erase at least one nonvolatile memory block of the plurality of nonvolatile memory blocks in the data storage device.

At a block 404, the management module may be configured to determine, calculate, and/or retrieve health parameters of the at least one nonvolatile memory block, the health parameters indicative of usage information of the at least one nonvolatile memory block.

At a block 406, the management module may be configured to determine and/or retrieve a retired block count based on a proportion of retired blocks to a quantity of available nonvolatile memory blocks in the data storage device.

At a block 408, the management module may be configured to determine and/or retrieve a power-on ratio based on a proportion of a quantity of hours the nonvolatile memory block has been powered-on and a warrantied quantity of powered hours for the nonvolatile memory block in the data storage device.

At a block 410, the management module may be configured to determine and/or retrieve a write amplification metric based on a proportion of times the nonvolatile memory block of storage in the data storage device was written to and read from.

At a block 412, the management module may be configured to determine and/or retrieve a program fail ratio based on a proportion of a quantity of nonvolatile memory blocks in the data storage device added to a defect list in response to a programming failure of a nonvolatile memory block in the data storage device compared to a quantity of available nonvolatile memory blocks in the data storage device.

At a block 414, the management module may be configured to determine and/or retrieve an erase fail count based on a quantity of nonvolatile memory blocks in the data storage device added to a defect list in response to an erase failure of a nonvolatile memory block compared to a quantity of available nonvolatile memory blocks in the data storage device.

In a block 416, the management module may be configured to determine and/or retrieve a drive life metric based on a proportion of a current longevity of the data storage device to a warrantied life of the data storage device that includes the nonvolatile memory block.

In a block 418, the management module may be configured to weight the health parameters to generate a weightage rating of each of the health parameters based on criticality to securely erase the at least one nonvolatile memory block.

In a block 420, the management module may be configured to calculate range values of the health parameters based on a percentage measure of the health parameters.

In a block 422, the management module may be configured to calculate a failure index that the at least one nonvolatile memory block in the data storage device will be securely erased. In one embodiment, the management module may be configured to calculate a failure index based on the weightage rating and the range values of the health parameters to predict whether the at least one nonvolatile memory block in the data storage device is likely to be securely erased.

In a block 424, the management module may be configured to compare the calculated failure index (FI) to a threshold for making a decision. In one example, the threshold may be a percentage or probability of less than 1, and may be dynamic based on measured or heuristic data. In another example, the threshold may be a value between 0%-100%.

In a block 426, in response to the failure index being less than a threshold, the management module may be configured to execute the command to securely erase the at least one nonvolatile memory block.

In a block 428, in response to the failure index being greater than the threshold, the management module may be configured to complete the command to securely erase the at least one nonvolatile memory block.

In a block 430, the management module may be configured to retire the at least one nonvolatile memory block.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a plurality of nonvolatile memory blocks in a data storage device; and
a management module configured to:
receive a command to securely erase at least one nonvolatile memory block of the plurality of nonvolatile memory blocks;

determine a plurality of health parameters of the at least one nonvolatile memory block, wherein:
  each health parameter of the plurality of health parameters is indicative of usage information of the at least one nonvolatile memory block;
  at least one health parameter of the plurality of health parameters is indicative of total usage information for the plurality of nonvolatile memory blocks; and
  at least one health parameter of the plurality of health parameters is usage information for a first nonvolatile memory block of the at least one nonvolatile memory block;
determine a weightage rating for each health parameter of the plurality of health parameters, wherein each weightage rating indicates a relative contribution of that health parameter to a failure index;
calculate a range value for each health parameter of the plurality of health parameters based on a percentage measure of that health parameter;
calculate the failure index to predict whether the at least one nonvolatile memory block is likely to be securely erased,
  wherein the failure index is based on:
    the weightage rating for each health parameter of the plurality of health parameters; and
    the range value for each health parameter of the plurality of health parameters; and
execute, responsive to the failure index being less than a threshold, the command to securely erase the at least one nonvolatile memory block.

2. The system of claim 1, wherein the management module is executed by a processor of the data storage device.

3. The system of claim 1, wherein the plurality of health parameters includes a retired block count based on a proportion of retired blocks in the data storage device to a quantity of available blocks in the data storage device.

4. The system of claim 1, wherein the plurality of health parameters includes a power-on ratio based on a proportion of a quantity of hours the first nonvolatile memory block of the at least one nonvolatile memory block has been powered-on to a warrantied quantity of powered hours for the first nonvolatile memory block of the at least one nonvolatile memory block.

5. The system of claim 1, wherein the plurality of health parameters includes a write amplification metric based on a proportion of times the first nonvolatile memory block of the at least one nonvolatile memory block was written to and read from.

6. The system of claim 1, wherein:
the plurality of health parameters includes a program fail ratio based on a proportion of a quantity of nonvolatile memory blocks in the data storage device added to a defect list compared to a quantity of available nonvolatile memory blocks in the data storage device; and
the data storage device is configured to add the quantity of nonvolatile memory blocks to the defect list responsive to programming failures of the quantity of nonvolatile memory blocks.

7. The system of claim 1, wherein:
the plurality of health parameters includes an erase fail count based on a quantity of nonvolatile memory blocks in the data storage device added to a defect list compared to a quantity of available nonvolatile memory blocks in the data storage device; and
the data storage device is configured to add the quantity of nonvolatile memory blocks to the defect list responsive to erase failures of the quantity of nonvolatile memory blocks.

8. The system of claim 1, wherein the plurality of health parameters includes a drive life metric of the data storage device based on a proportion of a current longevity of the data storage device to a warrantied life of the data storage device.

9. The system of claim 1, further comprising a main controller configured to:
manage a plurality of data storage devices in a composable infrastructure;
determine the failure index for each data storage device of the plurality of data storage devices;
compare the failure index for each data storage device of the plurality of data storage devices to the threshold; and
selectively bypass, responsive to the failure index of at least one data storage device of the plurality of data storage devices being greater than the threshold, the at least one data storage device during a decomposition event.

10. The system of claim 1, wherein the management module is further configured to,
in response to the failure index being greater than the threshold:
  complete the command to securely erase the at least one nonvolatile memory block; and
  retire the at least one nonvolatile memory block.

11. A method, comprising:
receiving a command to securely erase at least one nonvolatile memory block of a plurality of nonvolatile memory blocks in a data storage device;
determining a plurality of health parameters of the at least one nonvolatile memory block, wherein:
  each health parameter of the plurality of health parameters is indicative of usage information of the at least one nonvolatile memory block;
  at least one health parameter of the plurality of health parameters is indicative of total usage information for the plurality of nonvolatile memory blocks; and
  at least one health parameter of the plurality of health parameters is usage information for a first nonvolatile memory block of the at least one nonvolatile memory block;
determining a weightage rating for each health parameter of the plurality of health parameters, wherein each weightage rating indicates a relative contribution of that health parameter to a failure index;
calculating a range value for each health parameter of the plurality of health parameters based on a percentage measure of that health parameter;
calculating the failure index to predict whether the at least one nonvolatile memory block is likely to be securely erased, wherein the failure index is based on:
  the weightage rating for each health parameter of the plurality of health parameters; and
  the range value for each health parameter of the plurality of health parameters; and
executing, responsive to the failure index being less than a threshold, the command to securely erase the at least one nonvolatile memory block.

12. The method of claim 11, further comprising,
in response to the failure index exceeding the threshold:
completing the command to securely erase the at least one nonvolatile memory block; and
retiring the at least one nonvolatile memory block.

13. The method of claim 11, wherein determining the plurality of health parameters comprises determining a retired block count based on a proportion of retired blocks to a quantity of available nonvolatile memory blocks in the data storage device.

14. The method of claim 11, wherein determining the plurality of health parameters comprises determining a power-on ratio based on a proportion of a quantity of hours the first nonvolatile memory block of the at least one nonvolatile memory block has been powered-on and a warrantied quantity of powered hours for the first nonvolatile memory block of the at least one nonvolatile memory block in the data storage device.

15. The method of claim 11, wherein determining the plurality of health parameters comprises determining a write amplification metric based on a proportion of times the first nonvolatile memory block of the at least one nonvolatile memory block in the data storage device was written to and read from.

16. The method of claim 11, wherein:
determining the plurality of health parameters comprises determining a program fail ratio based on a proportion of a quantity of nonvolatile memory blocks in the data storage device added to a defect list compared to a quantity of available nonvolatile memory blocks in the data storage device; and
the quantity of nonvolatile memory blocks is the quantity of nonvolatile memory blocks added to the defect list responsive to programming failures.

17. The method of claim 11, wherein:
determining the plurality of health parameters comprises determining an erase fail count based on a quantity of nonvolatile memory blocks in the data storage device added to a defect list compared to a quantity of available nonvolatile memory blocks in the data storage device; and
the quantity of nonvolatile memory blocks is the quantity of nonvolatile memory blocks added to the defect list responsive to erase failures.

18. The method of claim 11, wherein determining the plurality of health parameters comprises determining a drive life metric based on a proportion of a current longevity of the data storage device to a warrantied life of the data storage device.

19. The method of claim 11, further comprising:
managing a plurality of data storage devices in a composable infrastructure;
determining the failure index for each data storage device of the plurality of data storage devices;
comparing the failure index for each data storage device of the plurality of data storage devices to the threshold; and
selectively bypassing, responsive to the failure index of at least one data storage device of the plurality of data storage devices being greater than the threshold, the at least one data storage device during a decomposition event.

20. A system, comprising:
a plurality of nonvolatile memory blocks in a data storage device;
means for receiving a command to securely erase at least one nonvolatile memory block of the plurality of nonvolatile memory blocks in the data storage device;
means for determining a plurality of health parameters of the at least one nonvolatile memory block, wherein:
each health parameter of the plurality of health parameters is indicative of usage information of the at least one nonvolatile memory block;
at least one health parameter of the plurality of health parameters is indicative of total usage information for the plurality of nonvolatile memory blocks; and
at least one health parameter of the plurality of health parameters is usage information for a first nonvolatile memory block of the at least one nonvolatile memory block;
means for determining a weightage rating for each health parameter of the plurality of health parameters, wherein each weightage rating indicates a relative contribution of that health parameter to a failure index;
means for calculating a range value for each health parameter of the plurality of health parameters based on a percentage measure of that health parameter;
means for calculating the failure index to predict that the at least one nonvolatile memory block will be securely erased, wherein the failure index is based on:
the weightage rating for each health parameter of the plurality of health parameters; and
the range value for each health parameter of the plurality of health parameters; and
means for executing, responsive to the failure index being less than a threshold, the command to securely erase the at least one nonvolatile memory block.

* * * * *